(12) United States Patent
Busse

(10) Patent No.: US 9,264,773 B2
(45) Date of Patent: Feb. 16, 2016

(54) DISTRIBUTION SYSTEM FOR SUBSCRIPTION-BASED PROGRAMS

(75) Inventor: Martin Busse, Woburn, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 551 days.

(21) Appl. No.: 13/288,295

(22) Filed: Nov. 3, 2011

(65) Prior Publication Data

US 2013/0117777 A1   May 9, 2013

(51) Int. Cl.
*H04N 7/16* (2011.01)
*H04N 21/45* (2011.01)
*H04N 21/472* (2011.01)
*H04N 21/482* (2011.01)

(52) U.S. Cl.
CPC ..... *H04N 21/4532* (2013.01); *H04N 21/47202* (2013.01); *H04N 21/482* (2013.01)

(58) Field of Classification Search
CPC ... H04N 7/163; H04N 21/4532; H04N 7/165; H04N 21/4623; H04N 21/84; H04N 21/4751; H04N 21/4753; H04N 5/44543; H04N 7/17318; H04N 21/4126; H04N 21/42204; H04N 5/4401; H04N 21/4722; H04N 5/775; H04N 21/4622; H04N 21/482
USPC ................ 725/9, 25, 30, 46, 47, 133, 141, 27
See application file for complete search history.

(56) References Cited

U.S. PATENT DOCUMENTS

| | | | |
|---|---|---|---|
| 2002/0133393 A1* | 9/2002 | Tatsumi et al. | 705/10 |
| 2003/0005446 A1* | 1/2003 | Jaff et al. | 725/51 |
| 2006/0212906 A1* | 9/2006 | Cantalini | 725/62 |
| 2007/0093199 A1* | 4/2007 | Bowen et al. | 455/3.02 |
| 2010/0192180 A1* | 7/2010 | Olague et al. | 725/42 |
| 2011/0138438 A1* | 6/2011 | de Leeuw et al. | 725/139 |
| 2011/0197213 A1* | 8/2011 | Shim et al. | 725/9 |

* cited by examiner

*Primary Examiner* — Ngoc Vu

(57) ABSTRACT

Methods and systems provide users with access to subscription-based programs on mobile devices. The programs include television programs associated with a television service package, on-demand programs, and at least one of television programs or on-demand programs recorded by users on digital video recording devices.

20 Claims, 9 Drawing Sheets

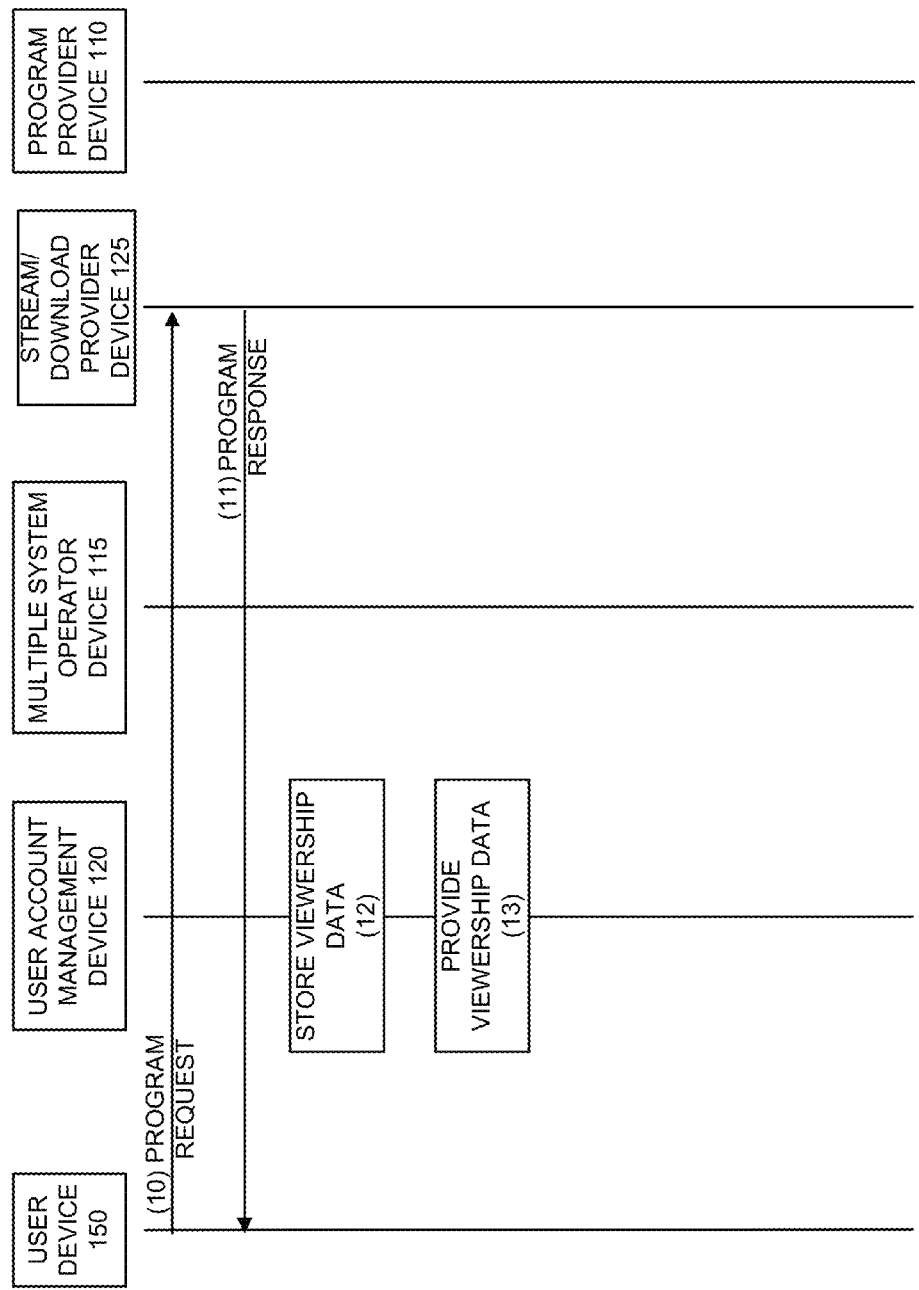

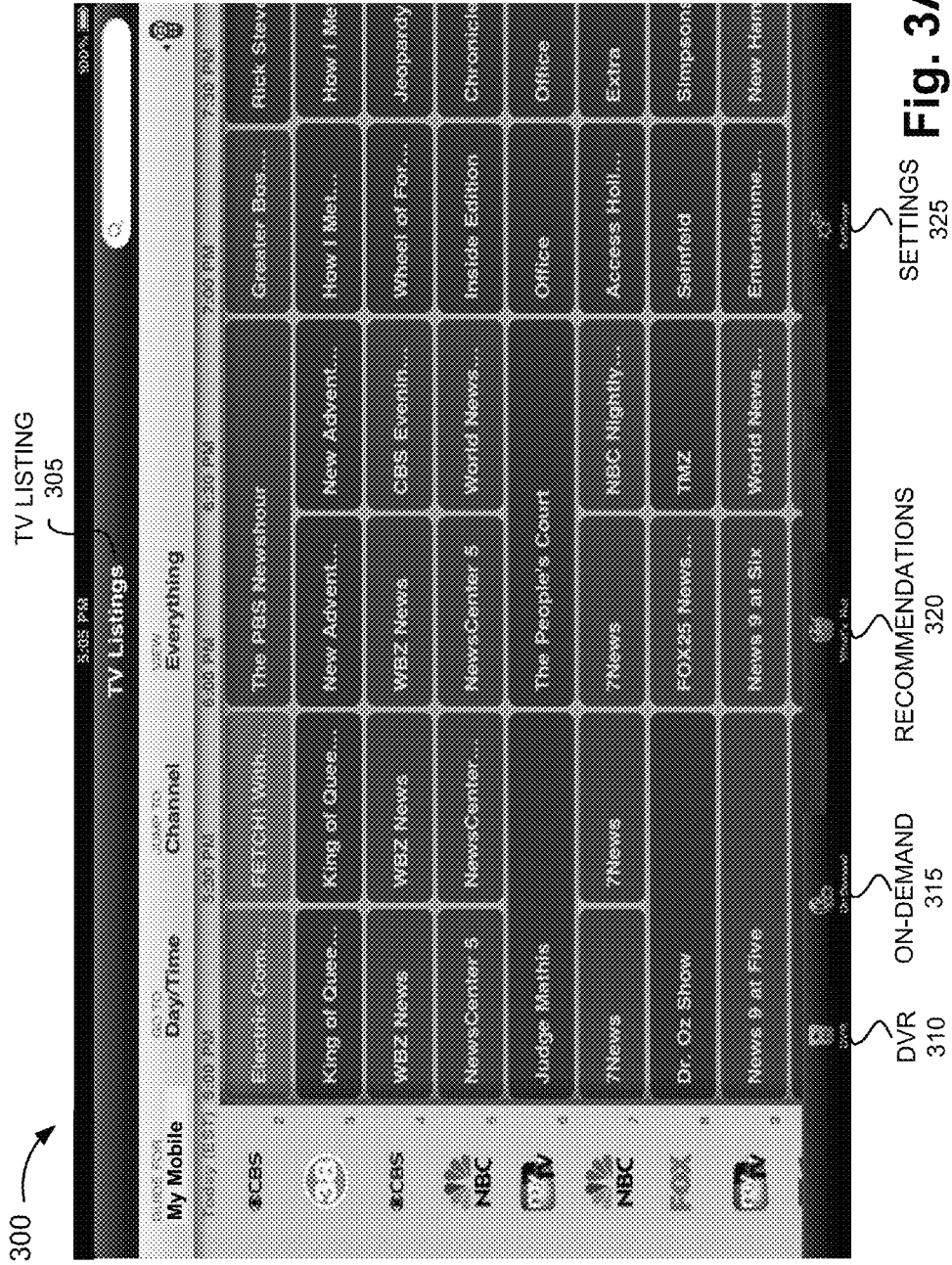

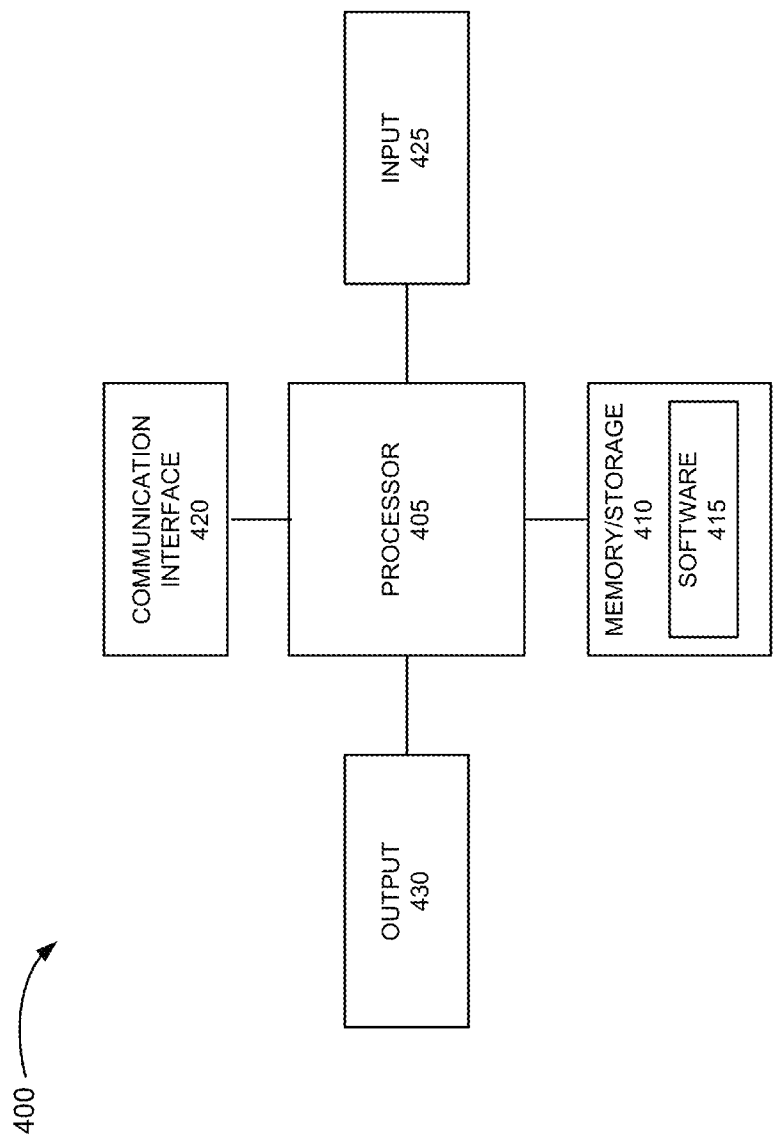

DISTRIBUTION SYSTEM FOR SUBSCRIPTION-BASED PROGRAMS

BACKGROUND

Program distribution systems provide users with an array of programs. Users may view the programs via various user devices, such as set top boxes and televisions.

BRIEF DESCRIPTION OF THE DRAWINGS

FIGS. 2A and 2B illustrate an exemplary messaging diagram pertaining to a distribution system for subscription-based programs;

FIG. 3A is a diagram illustrating an exemplary graphical user interface;

FIG. 4 is a diagram illustrating exemplary components of a device that may correspond to one or more of the devices in the environment depicted in FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "program," as used herein, includes subscription-based content. For example, a program includes linear content, such as live television (e.g., a local program, a national program, a sitcom, a movie, a sporting event, a news program, etc.), or on-demand content (e.g., an on-demand program, a pay-per-view program). Alternatively, a program includes recorded content. For example, a program may include content recorded by a user (e.g., using a digital video recorder (DVR) or other suitable recording/storage device). For purposes of description, a program includes metadata. Additionally, in some instances, a program may include only a portion of the entire program.

The term "metadata," as used herein, includes data that describes or relates to a program. For example, metadata may include a title of the program, a broadcaster, an air-time, an air-date, a program identifier (e.g., a string that identifies a program), a genre and/or a sub-genre, cast and credit details (e.g., actors, director, producer, etc.), a synopsis (e.g. plot), language, a content rating (e.g., mature, children, PG-13, etc.), a program format (e.g., standard definition, high-definition, 3-D, etc.), a year of release, an image (e.g., a poster), and/or a preview.

Figure 1:
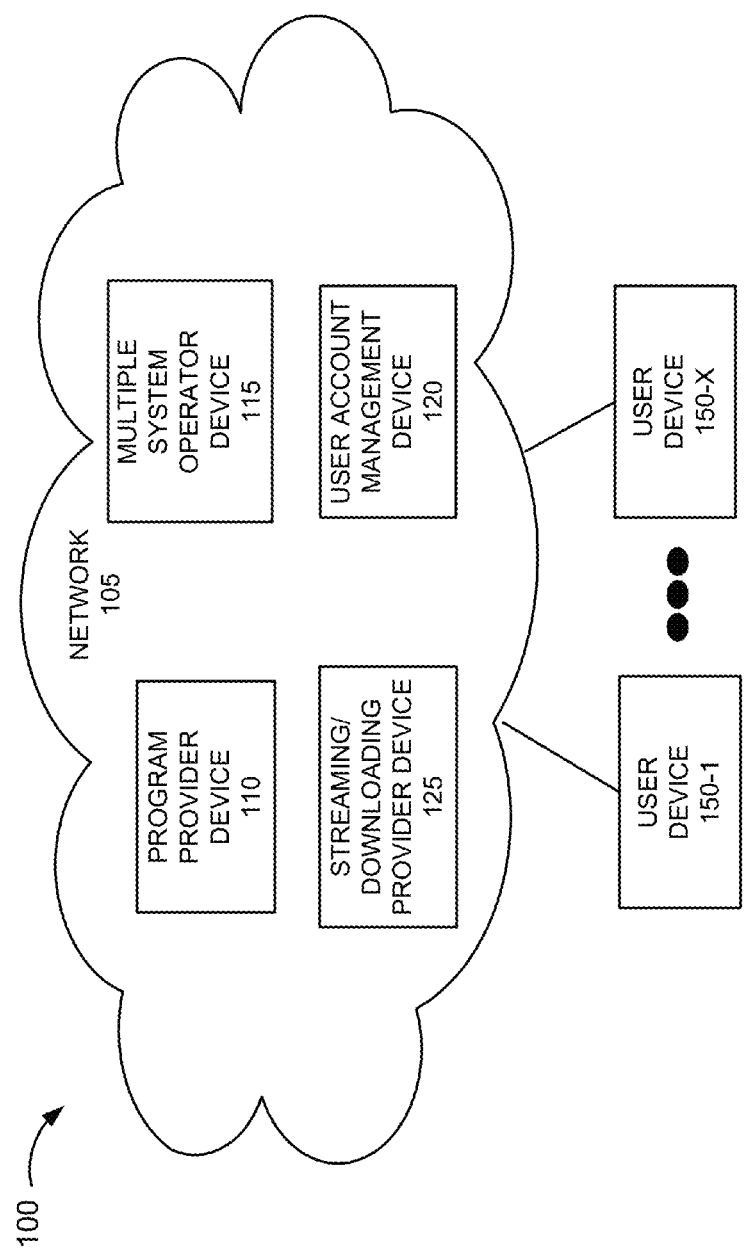
FIG. 1 is a diagram illustrating an exemplary environment in which an exemplary embodiment of a distribution system for subscription-based programs may be implemented.

FIG. 1 is a diagram illustrating an exemplary environment in which an exemplary embodiment of a distribution system for subscription-based programs may be implemented. As illustrated, environment 100 includes a network 105 that includes, among other devices, a program provider device 110, a multiple system operator (MSO) device 115, a user account management device 120, a streaming and/or downloading provider device 125. Additionally, environment 100 includes user devices 150-1 to 150-X, in which X>1 (referred to collectively as user devices 150 and individually as user device 150).

The number of devices and the configuration in environment 100 are exemplary and provided for simplicity. According to other embodiments, environment 100 may include additional devices, fewer devices, different devices, and/or differently arranged devices, than those illustrated in FIG. 1. For example, environment 100 may include multiple program provider devices 110, multiple system operator devices 115, and/or multiple streaming provider devices 125.

According to other embodiments, a single device in FIG. 1 may be implemented as multiple devices and/or multiple devices may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. Environment 100 may be implemented to include wired and/or wireless connections among the devices illustrated.

Network 105 includes multiple networks of various types. For example, program provider device 110 may be associated with a program provider network, multiple system operator device 115 may be associated with a television service provider network, a television distribution network, or some other type of program distribution network, and streaming/downloading provider device 125 may be associated with a streaming provider network and/or a program delivery network.

According to other embodiments, environment 100 may include additional networks, fewer networks, and/or different networks than those illustrated and/or described in reference to FIG. 1. For example, environment 100 may include other types of network(s), such as the Internet, a mobile network, etc. Additionally, according to other embodiments, environment 100 may include multiple program providers, streaming providers, etc., which in turn, may be associated with multiple networks.

Program provider device 110 includes a network device that distributes or makes available programs (including metadata) to other network devices. Program provider device 110 may be implemented as a computational device (e.g., a computer), a server (e.g., a Web server, an application server, etc.), a data management device and/or other suitable network device. Program provider device 110 may include a mass storage device to store programs.

Multiple system operator device 115 includes a network device to obtain programs (including metadata) from program provider device 110. Multiple system operator device 115 may be implemented as a computational device (e.g., a computer), a client (e.g., a Web client, an application client, etc.), a data management device and/or, or other suitable network device. Multiple system operator device 115 may include a mass storage device to store programs. Multiple system operator device 115 may be implemented within a data center for obtaining programs from program providers (e.g., content providers).

User account management device 120 includes a network device that stores user entitlement information. According to an exemplary embodiment, the user entitlement information pertains to programs available to a user having a subscription with a multiple system operator (e.g., a television service provider) or a user associated with the user having the subscription (e.g., a family member, etc.). User entitlement information includes information that indicates which live television channels are available to the user, what on-demand programs are available to the user, and what programs are available to the user that are stored (e.g., by the user's DVR device). According to an exemplary embodiment, user account management device 120 performs authentication and/or authorization of a user when the user uses the service provided by user account management device 120. According to an exemplary embodiment, user account management device 120 collects user viewership data. For example, the user viewership data includes the programs selected by a user, the type of user device, demographics associated with the user, etc. User account management device 120 may provide the user viewership data to interested parties (e.g., program creators, such as studios, etc.).

According to an exemplary embodiment, user account management device 120 may function as a program clearinghouse that serves as a gateway for accessing subscription-based programs. As described herein, according to an exemplary embodiment, user account management device 120 in conjunction with other devices depicted and described in FIG. 1, provides users with ubiquitous access to subscription-based programs via their mobile/portable devices. This is in contrast to existing program distribution networks or systems that limit the user's access to programs via non-mobile devices (e.g., set top box and television in the home or place of business, etc).

Streaming/downloading provider device 125 includes a network device that streams programs to users and/or permits users to download programs. According to an exemplary embodiment, streaming/downloading provider device 125 includes a streaming server. Streaming/downloading provider device 125 may support single bit rate streaming and/or multi-bit rate streaming. Streaming/downloading provider device 125 may support various protocols, such as, Real Time Streaming Protocol (RTSP), Real Time Messaging Protocol (RTMP), Hypertext Transfer Protocol (HTTP), Microsoft Media Services (MMS) protocol, etc.

According to an exemplary embodiment, streaming/downloading provider device 125 includes a device to encode programs for multiple types of user devices, such as, mobile devices. According to such an embodiment, for example, programs may be encoded according to the H.264 video format, Moving Picture Experts Group (MPEG-4) format, etc. According to another exemplary embodiment, streaming/downloading provider device 125 may not encode programs. For example, program provider devices may encode programs, multiple system operator devices 115 may encode programs, etc. According to an exemplary embodiment, streaming/downloading provider device 125 includes a downloading server. The downloading server may use well-known techniques for program delivery to users (e.g., progressive downloads, bit rate throttling, etc.). Users may download programs (e.g., on-demand content and recorded content) from streaming/downloading provider device 125. Streaming/downloading provider device 125 includes mass storage to store programs.

User device 150 includes mobile device and portable devices. For example, user device 150 may be implemented as a smartphone, a tablet device, a handheld device, a personal digital assistant (PDA), a palmtop device, a laptop computer, a netbook, a gaming device, or a vehicular communication system (e.g., in a car, etc.).

Figure 2A:
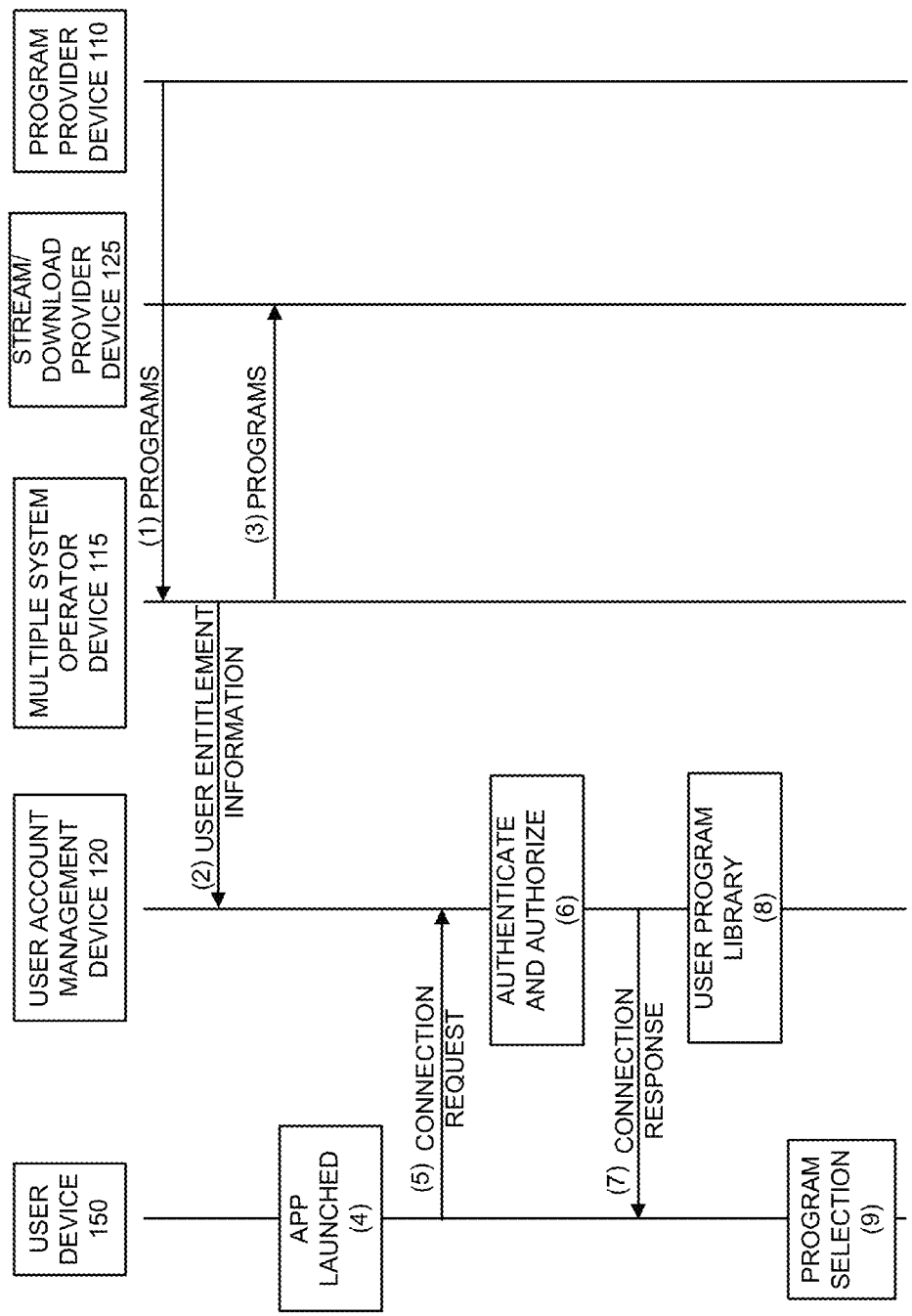

FIGS. 2A and 2B illustrate an exemplary messaging diagram pertaining to a distribution system for subscription-based programs.

As illustrated in step (1), program provider device 110 provides programs to multiple system operator device 115. The programs include linear content and on-demand content. Multiple system operator device 115 stores the programs. It may be assumed that these programs have been authorized (e.g., by a negotiated licensing agreement) for mobile or out-of-the-home user consumption.

In step (2), multiple system operator device 115 transmits user entitlement information to user account management device 120. User entitlement information includes information indicating television channels of a television package to which a user is subscribed, what on-demand programs are available to the user, and what programs are available to the user that are stored by a user device (e.g., by the user's DVR device). For example, a user subscribes to a particular television package (e.g., basic, deluxe, premium, etc.) that permits the user access to television channels provided by a television service provider via a set top box. The user entitlement information includes the television channels associated with the television package. Additionally, the user entitlement information includes on-demand programs. The on-demand programs include video-on-demand programs and pay-per-view programs. Additionally, the user may store a program or a portion of a program (e.g., a favorite scene in a movie, etc.) on a DVR device or a network device. By way of example, the user entitlement information may include program identifiers to indicate the programs available to the user and metadata associated with the program identifiers. The user entitlement information also includes where the programs are hosted (e.g., network address associated with streaming/downloading provider device 125).

As described further below, user account management device 120 provides a user program library via graphical user interfaces that includes programs available to the user. According to an exemplary implementation, the user program library may include other information, such as user preferences, favorite channels, etc. Thus, according to an exemplary embodiment, multiple system operator device 115 transmits additional account information pertaining to a user, such as user preferences, etc. The account information may correspond to information associated with the user's subscription for receiving programs from the multiple system operator (e.g., a television service provider) in a user's home via non-mobile devices (e.g., a set top box and television).

In step (3), multiple system operator device 115 transmits programs to streaming/downloading provider device 125. Streaming provide device 125 stores the programs. In step (4), the user starts an application via user device 150. In step (5), user device transmits a connection request to user account management device 120. The connection request is received by user account management device 120 and a session is established. The user is prompted to enter user login information (e.g., a user identifier and a password). According to an exemplary implementation, it may be assumed that a user of user device 150 has previously registered user device 150 with user account management device 120. The registration process includes user account management device 120 obtaining user device information (e.g., type of device, such as iPad® device). A user may also setup an account with user account management device 120. User account management device 120 may obtain user information (e.g., name, address, contact information, MSO provider, etc.).

In step (6), user account management device 120 authenticates and authorizes the user. For example, user account management device 120 may obtain user login information when the user initially establishes an account for the services described herein. In step (7), user account management device 120 transmits a connection response and, in step (8), provides a graphical user interface (e.g., a user program library) that enables, among other things, the user to select a program. For example, according to an exemplary embodiment, the user interface includes a programming guide that lists programs according to the user's subscription (e.g., a television package) and menus to access and select on-demand programs and programs stored on a DVR device (e.g., by the user). Additionally, according to an exemplary embodiment, the user interface includes other graphical elements to permit the user to access other information and set user preferences. For example, the user may set one or more favorite channel listings, a recommendation setting (e.g., in which programs may be recommended to the user), a reminder list, on-demand information (e.g., previous purchases), bookmarks, etc.

FIG. 3A is a diagram illustrating an exemplary graphical user interface 300. As illustrated, graphical user interface 300 includes a television listing 305. Television listing 305 includes programs available to a user based on his/her subscription. Additionally, graphical user interface 300 includes a menu. The menu includes a DVR icon 310, an on-demand icon 315, a recommendations icon 320, and a settings icon 325. The user may access recorded programs via DVR icon 310 and access on-demand programs via on-demand icon 315. Additionally, the user may obtain program recommendations via recommendations icon 320 and set preferences and settings via settings icon 325. For example, the program recommendations are based on the programs selected by the user.

Referring back to FIG. 2A, in step (9), the user selects a program via the user interface. Referring to FIG. 2B, in step (10), user device 150 transmits a program request to streaming/downloading provider device 125. For example, according to an exemplary implementation, in response to the user's program selection, user account management device 120 provides the network address of streaming/downloading provider device 125 to user device 150. According to other implementations, a session between user device 150 and streaming/downloading provider device 125 may be established according to other conventional methods. According to an exemplary embodiment, user account management device 120 may provide authorization information to streaming/downloading provider device 125. For example, the authorization information may include user device information (e.g., type of device, device capabilities, etc.) and/or user information (e.g., a user account management identifier associated with the user's account with user account management device 120).

Figure 3B:
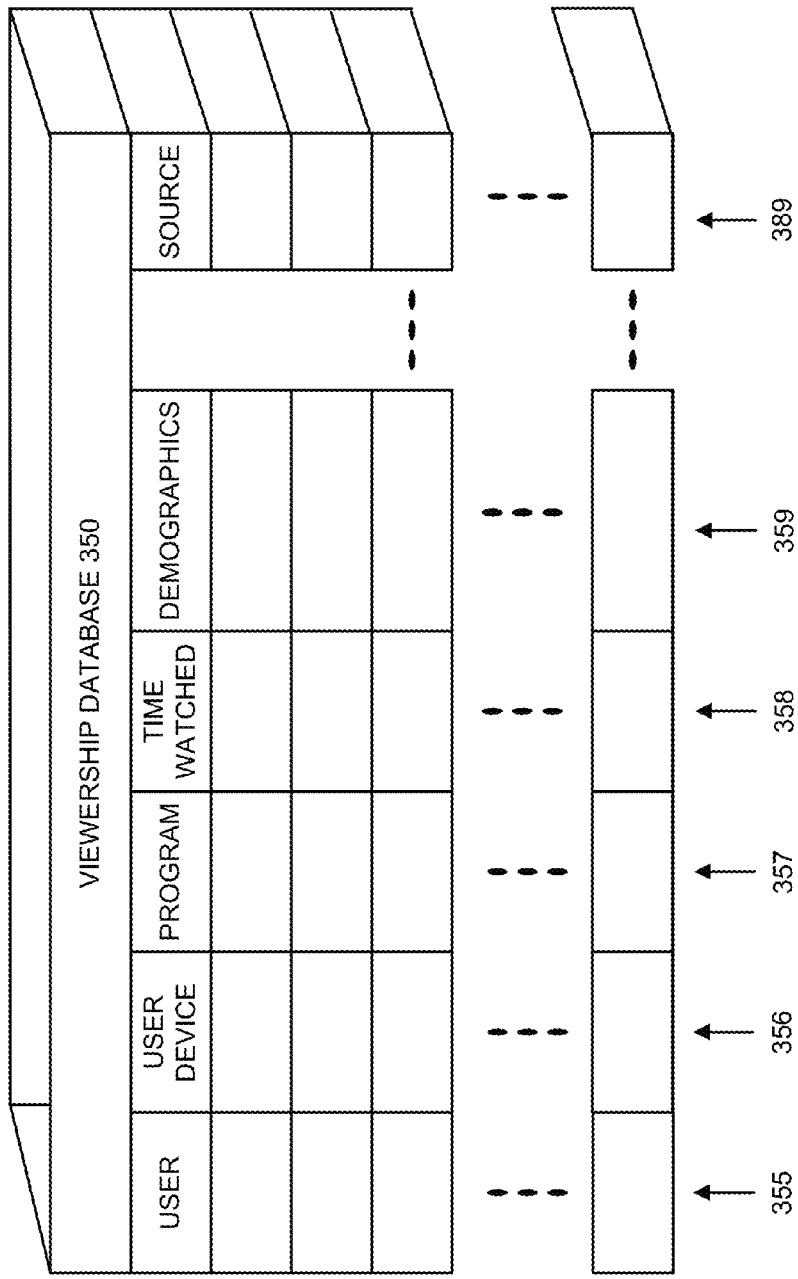
FIG. 3B is a diagram illustrating an exemplary viewership database.

In step (11), streaming/downloading provider device 125 streams or downloads the selected program to user device 150. In step (12), user account management device 120 stores viewership data. FIG. 3B is a diagram illustrating a viewership database 350 storing exemplary viewership data. As illustrated, viewership database 350 includes a user field, a user device field 356, a program field 357, a time watched field, a demographics field 359 and a source field 389. According to other implementations, viewership database 350 may include additional, fewer, and/or different informational fields.

User field 355 includes a user identifier that indicates a user. User device field 356 includes a user device identifier that indicates a user device (e.g., an iPAD® device, an iPhone® device, Motorola Xoom® tablet device, etc.). User device field 356 may include other information pertaining to the user device (e.g., display size, operating system, etc.). Program field 357 includes a program identifier that indicates the program. Time watched field indicates a date and time (or time period) the user chose to stream or download the program. Demographics field 359 includes demographic information pertaining to the user. By way of example, the demographic information may include the gender of the user, the age of the user, financial information, address information, etc. Source field 389 includes information indicating the source of program, such as, whether the program is an on-demand program, a program recorded by the user (e.g., on a DVR device), or a program associated with live television.

Referring to FIG. 2B, in step (13), user account management device 120 provides the viewership data to other network devices. For example, the other network devices may be associated with a multiple system operator, a studio or a television network operator (e.g., Sony, Paramount, NBC, etc.), and/or other interested parties.

Although FIGS. 2A and 2B illustrate exemplary messages, according to other embodiments, additional, different, or fewer messages may be implemented. Additionally, or alternatively, according to other embodiments, additional, fewer, and/or different types of information and/or data may be included in a message.

FIG. 4 is a diagram illustrating exemplary components of a device 400 that may correspond to one or more of the devices in environment 100. As illustrated, according to an exemplary embodiment, device 400 includes a processor 405, memory/storage 410 storing software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, the instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

Figure 5A:
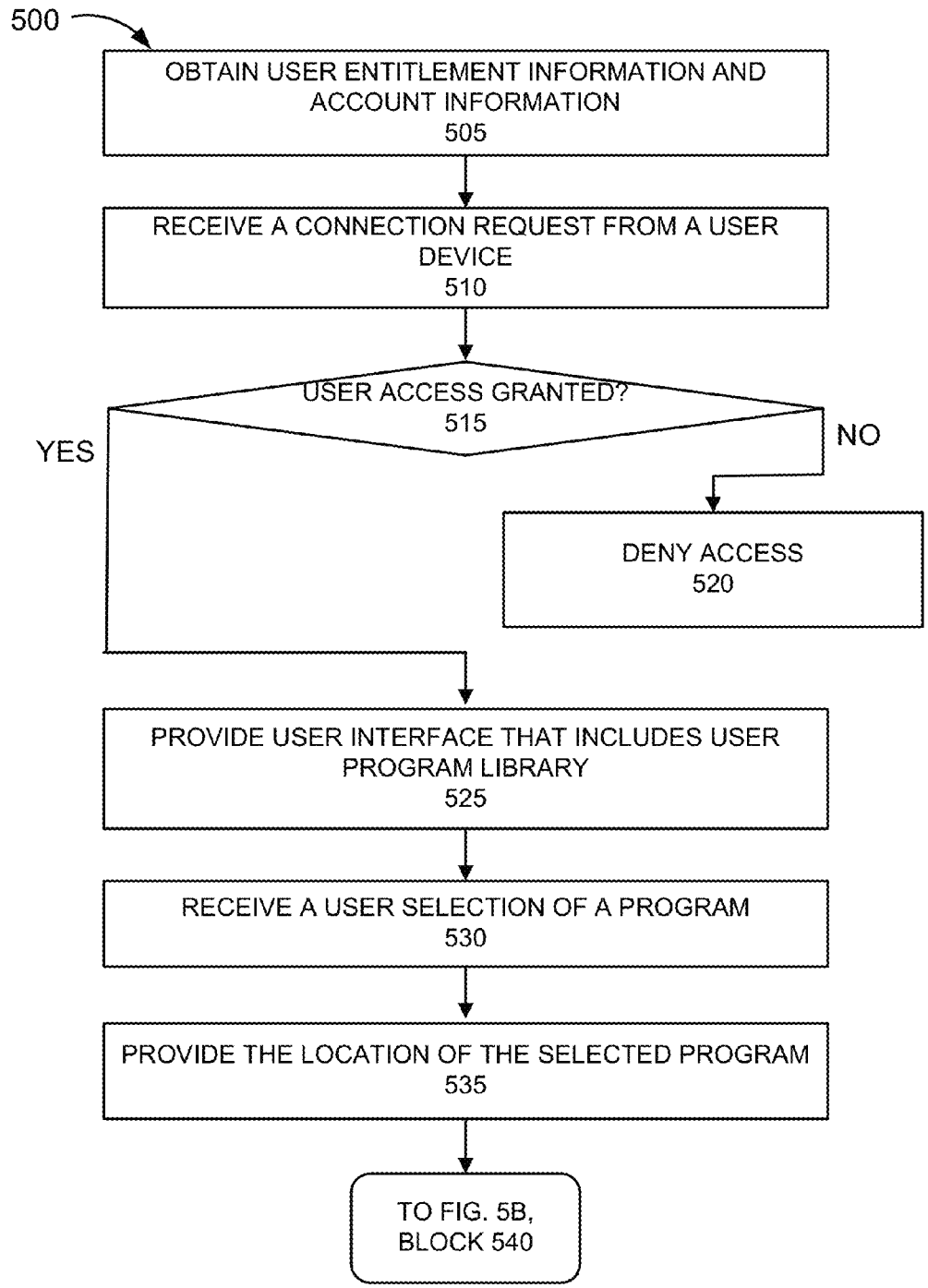
FIGS. 5A and 5B are flow diagrams illustrating an exemplary process pertaining to an exemplary embodiment of a distribution system for subscription-based programs.
Figure 5B:
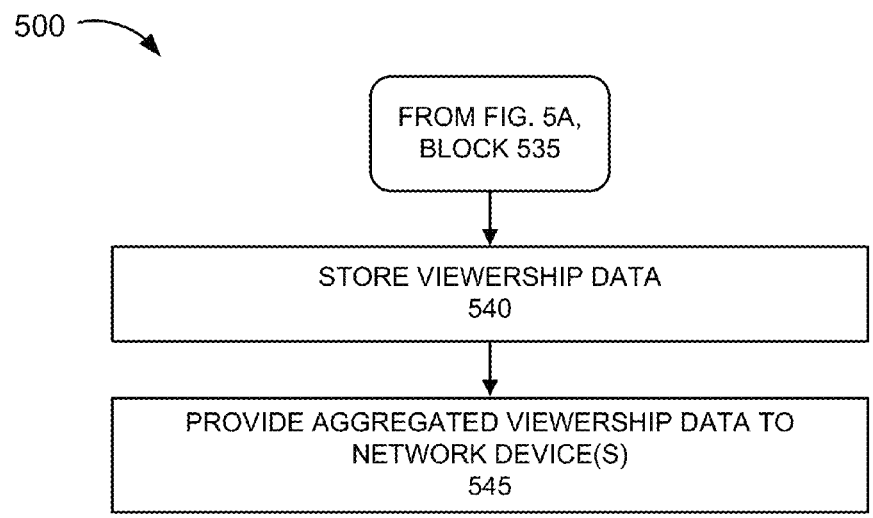

FIGS. 5A and 5B are flow diagrams illustrating an exemplary process 500 pertaining to an exemplary embodiment of a distribution system for subscription-based programs. According to an exemplary embodiment, user account management device 120 may perform one or more of the steps described in process 500. For example, processor 405 may execute software 415 to perform the steps described.

Referring to FIG. 5A, in block 505, user entitlement information and account information is obtained. For example, user account management device 120 receives user entitlement information from multiple system operator device 115. As previously described, user entitlement information includes information (e.g., program identifiers, metadata, etc.) pertaining to live television programs or television channels, on-demand programs, and user-recorded programs available to the user. The user entitlement information may include user information (e.g., name, address, demographic information, etc.). User account management device 120 may also receive account information, such as user preferences, etc., as previously described.

In block 510, a connection request is received from a user device. For example, user account management device 120 receives a connection request from user device 150. User account management device 120 establishes a connection with user device 150. In block 515, it is determined whether user access is permitted. For example, user account management device 120 provides a user interface to permit authentication and authorization verification of the user. User account management device 120 determines whether the user is authenticated and authorized access to the subscription-based programs based on information provided by the user via the user interface.

If it is determined that user access is not permitted (block 515-NO), then access is denied (block 520). For example, user account management device 120 indicates to the user, via the user interface, that the user's access is denied. If it is determined that user access is permitted (block 515-YES), a user interface that includes a user program library is provided (block 525). For example, user account management device 120 provides a graphical user interface (e.g., graphical user interface 300 of FIG. 3A) that permits the user to navigate to and/or select a program to view (e.g., stream, download).

In block 530, a user selection of a program is received (block 530). For example, user account management device 120 receives a user selection of a program. For example, the program may be a television program, an on-demand program, or a user recorded program.

In block 535, the location of the selected program is provided (block 535). For example, user account management device 120 provides user device 150 the network address of a streaming provider device (e.g., streaming/downloading provider device 125) that is hosting the selected program. According to an exemplary implementation, user account management device 120 provides streaming/downloading provider device 125 with information pertaining to the user and/or user device 150 (e.g., authorization information, etc.).

Referring to FIG. 5B, in block 540, viewership data is stored (block 540). For example, user account management device 120 stores viewership data pertaining to the user and user device 150. As an example, the viewership data may include information illustrated and described in reference to FIG. 3B. In block 545, aggregated viewership data is provided to a network device (block 545). For example, user account management device 120 provides aggregated viewership data associated with users to interested parties (e.g., studios, program providers, etc.).

Although FIGS. 5A and 5B illustrate an exemplary process 500 pertaining to the provisioning of programs, according to other embodiments, process 500 may include additional operations, fewer operations, and/or different operations than those illustrated in FIGS. 5A and 5B and described herein.

Figure 6:
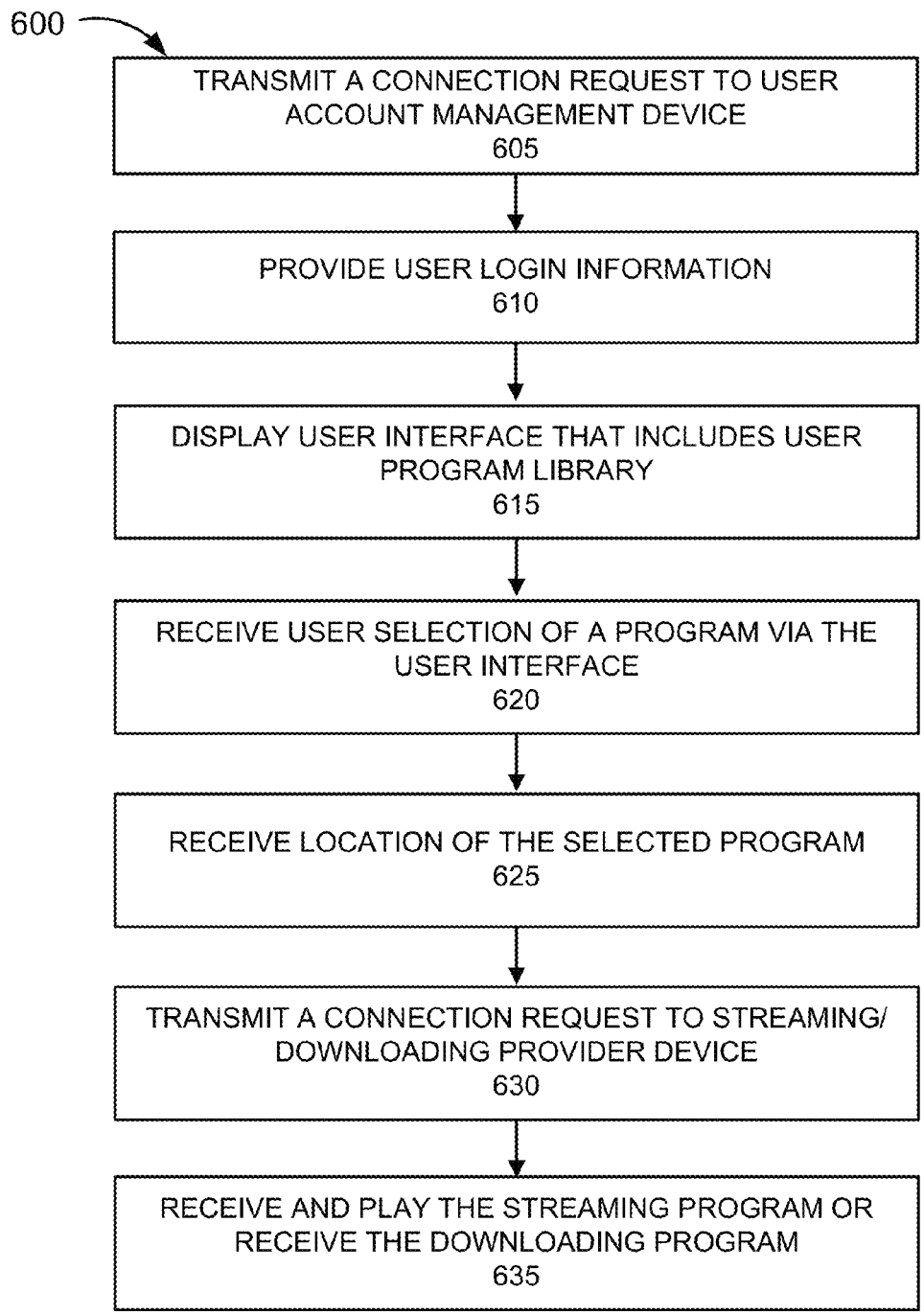
FIG. 6 is a flow diagram illustrating an exemplary process pertaining to an exemplary embodiment of a user device to receive subscription-based programs.

FIG. 6 is a flow diagram illustrating an exemplary process 600 pertaining to an exemplary embodiment of a user device to receive subscription-based programs. According to an exemplary embodiment, user device 150 may perform one or more of the steps described in process 600. For example, processor 405 may execute software 415 to perform the steps described.

Referring to FIG. 6, in block 605, a connection request is transmitted to a user account management device. For example, a user establishes a connection with user account management device 120 via user device 150. According to an exemplary embodiment, user device 150 may include a mobile application to connect to user account management device 120 and use the service provided by user account management device 120. According to another embodiment, user device 150 may include a browser to connect to and use the service provided by user account management device 120.

In block 610, user login information is provided. For example, user device 150 receives login information from the user via a user interface and provides the login information to user account management device 120. In this example, it may be assumed that the user is authenticated and authorized. In block 615, a user interface that includes a user program library is displayed. For example, user account management device 120 provides a graphical user interface (e.g., graphical user interface 300 of FIG. 3A) to user device 150. The user may navigate to and/or select a program to view via the user interface.

In block 620, a user selection of a program is received via the user interface. For example, user device 150 receives a user input that selects a particular program. In block 625, a location of the selected program is received. For example, in response to the program selection, user device 150 receives (e.g., from user account management device 120) a network address of a device that will stream and/or download the selected program to user device 150. In block 630, a connection request to a streaming/downloading provider device is transmitted, and in block 635, the streaming program is received and displayed or the downloading program is received. For example, user device 150 establishes a session with streaming/downloading provider device 125. User device 150 receives the streamed program from streaming/downloading provider device 125 and plays the program to the user. Alternatively, user device 150 receives the downloading program from streaming/downloading provider device 125 and stores the program. The user may also play the program as the program is being downloaded.

Although FIG. 6 illustrates an exemplary process 600 pertaining to an exemplary embodiment of a user device to receive subscription-based programs, according to other embodiments, process 600 may include additional operations, fewer operations, and/or different operations than those illustrated in FIG. 6 and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A, 5B, and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:

providing, by a network device, a network-side, program clearinghouse service for television service providers and their respective users, wherein the network-side, program clearinghouse service includes directing their respective users to devices that at least one of stream or download programs to mobile devices after their respective users have been authenticated and authorized on behalf of the television service providers;

transmitting, by a multiple system operator device of a television service provider, to the network device, user entitlement information pertaining to all users of a multiple system operator service provided by the television service provider, wherein the user entitlement information includes the users' subscriptions pertaining to all programs offered by the television service provider via the multiple system operator service, wherein the programs include television programs associated with television service packages, on-demand programs, and at least one of television programs or on-demand programs recorded by the users on digital video recording devices, and wherein the multiple system operator device stores the programs;

receiving, by the network device and from the multiple system operator device, the user entitlement information pertaining to the users of the multiple system operator service;

receiving, by the network device, requests from the users of the multiple system operator service via mobile devices to access the programs;

determining, by the network device, whether access is permitted by the users of the multiple system operator service in response to receiving the requests;

providing, by the network device, in response to determining that access is permitted, user interface program libraries that permit the users of the multiple system operator service to select programs to view based on the user entitlement information associated with each user;

receiving, by the network device, selections of programs via the user interface program libraries;

providing, by the network device, network addresses of devices that will at least one of stream or download the programs to the mobile devices associated with the users of the multiple system operator service, based on the selections of the programs;

aggregating, by the network device, viewership information pertaining to the users of the multiple system operator service, wherein the viewership information includes information indicating programs viewed by the users; and
disseminating, by the network device, the viewership information to another network device.

2. The method of claim 1, wherein the viewership information indicates sources of the programs by which the users viewed the programs, wherein the sources include the digital video recording devices, and wherein the other network device includes a third party network device.

3. The method of claim 1, wherein the user interface program libraries include graphical elements to permit the users of the multiple system operator service to set user preferences and view information pertaining to recommended programs.

4. The method of claim 1, wherein the determining comprises:
performing authentication and authorization of the users of the multiple system operator service.

5. The method of claim 1, further comprising:
transmitting authorization information to the devices based on successfully authenticating and authorizing the users of the multiple system operator service.

6. The method of claim 1, further comprising:
receiving, by the network device, registration information from the users of the multiple system operator service, wherein the registration information includes a name of the television service provider; and
provisioning, by the network device, accounts for the network-side, program clearinghouse service, on behalf of the users of the multiple system operator service, based on the registration information.

7. The method of claim 1, wherein the user entitlement information includes program identifiers, metadata associated with the program identifiers, and location information indicating the network addresses of the devices.

8. A network device comprising:
a communication interface;
one or more memories that store instructions; and
one or more processors to execute the instructions to:
provide a network-side, program clearinghouse service for multiple system operators and their respective users, wherein the network-side, program clearinghouse service includes directing their respective users to devices that at least one of stream or download programs to mobile devices after their respective users have been authenticated and authorized on behalf of the multiple system operators;
receive, via the communication interface, user entitlement information pertaining to all users having subscriptions with a multiple system operator, wherein the user entitlement information includes all the users' subscriptions pertaining to all programs offered by the multiple system operator, and wherein the programs include television programs associated with television service packages, on-demand programs, and at least one of television programs or on-demand programs recorded by the users on digital video recording devices;
receive, via the communication interface, requests from the users of the multiple system operator via mobile devices to access the programs;
determine whether access is permitted by the users of the multiple system operator in response to the requests;
provide, via the communication interface, in response to a determination that access is permitted, user interface program libraries that permit the users of the multiple system operator to select programs to view based on the user entitlement information associated with each user;
receive, via the communication interface, selections of programs via the user interface program libraries;
provide, via the communication interface, network addresses of devices that will at least one of stream or download the programs to the mobile devices associated with the users of the multiple system operator, based on the selections of the programs;
aggregate viewership information pertaining to the users of the multiple system operator, wherein the viewership information includes information indicating programs viewed by the users; and
disseminate, via the communication interface, the viewership information to another device.

9. The network device of claim 8, wherein, when determining, the one or more processors further execute the instructions to:
authenticate and authorize the users of the multiple system operator to use the network-side, program clearinghouse service.

10. The network device of claim 8, wherein the one or more processors further execute the instructions to:
transmit, via the communication interface, authorization information to the devices based on successfully authenticating and authorizing the users of the multiple system operator.

11. The network device of claim 8, wherein the viewership information indicates sources of the programs by which the users of the multiple system operator viewed the programs, wherein the sources include the digital video recording devices, and wherein the other device includes a third party network device.

12. The network device of claim 11, wherein the viewership information includes date and time the users viewed or downloaded programs and type of mobile devices.

13. The network device of claim 8, wherein the user entitlement information includes program identifiers, metadata associated with the program identifiers, and location information indicating the network addresses of the devices, and wherein the one or more processors further execute the instructions to:
receive, via the communication interface, registration information from the users of the multiple system operator, wherein the registration information includes a name of the multiple system operator; and
provision, by the device, accounts for the network-side, program clearinghouse service, on behalf of the users of the multiple system operator, based on the registration information.

14. The network device of claim 8, wherein the user interface program libraries include graphical elements to permit the users of the multiple system operator to set user preferences and view information pertaining to recommended programs.

15. The network device of claim 8, wherein the one or more processors further execute the instructions to:
receive, via the communication interface, account information pertaining to the users of the multiple system operator, wherein the account information includes user preferences associated with the users' subscription.

16. A non-transitory storage medium storing instructions executable by a processor of a computational device, which when executed, cause the computational device to:

provide a network-side, program clearinghouse service for multiple system operators and their respective users, wherein the network-side, program clearinghouse service includes directing their respective users to devices that at least one of stream or download programs to mobile devices after their respective users have been authenticated and authorized on behalf of the multiple system operators;

receive user entitlement information pertaining to all users of a multiple system operator having subscriptions with the multiple system operator, wherein the user entitlement information includes all the users' subscriptions pertaining to all programs offered by the multiple system operator, and wherein the programs include television programs associated with a television service package, on-demand programs, and at least one of television programs or on-demand programs recorded by the users on digital video recording devices;

receive requests from the users of the multiple system operator, via mobile devices, to access the programs;

determine whether access is permitted by the users of the multiple system operator in response to the requests;

provide, in response to a determination that access is permitted, user interface program libraries that permit the users of the multiple system operator to select programs to view based on the user entitlement information associated with each user;

receive selections of programs via the user interface program libraries;

provide network addresses of devices that will at least one of stream or download the programs to the mobile devices associated with the users of the multiple system operator based on the selections of the programs;

aggregate viewership information pertaining to the users of the multiple system operator, wherein the viewership information includes information indicating programs viewed by the users; and disseminate the viewership information to a network device.

17. The non-transitory storage medium of claim 16, wherein the viewership information indicates sources of the programs by which the users viewed the programs, wherein the sources include the digital video recording devices, and wherein the network device includes a third party network device.

18. The non-transitory storage medium of claim 16, wherein the user entitlement information includes program identifiers, metadata associated with the program identifiers, and location information indicating the network addresses of the devices.

19. The non-transitory storage medium of claim 16, further storing instructions executable by the processor of the computational device, which when executed, cause the computational device to:

store the user entitlement information in a database.

20. The non-transitory storage medium of claim 16, further storing instructions executable by the processor of the computational device, which when executed, cause the computational device to:

receive registration information from the users of the multiple system operator, wherein the registration information includes a name of the multiple system operator; and provision accounts for the network-side, program clearinghouse service, on behalf of the users of the multiple system operator, based on the registration information.

\* \* \* \* \*